United States Patent
Liu et al.

(10) Patent No.: US 10,530,231 B2
(45) Date of Patent: Jan. 7, 2020

(54) LINEAR VIBRATION MOTOR

(71) Applicant: GOERTEK INC., WeiFang, Shandong (CN)

(72) Inventors: Chunfa Liu, Shandong (CN); Fenglei Zu, Shandong (CN)

(*) Notice: Subject to any disclaimer, the term of this patent is extended or adjusted under 35 U.S.C. 154(b) by 42 days.

(21) Appl. No.: 15/776,788

(22) PCT Filed: May 19, 2016

(86) PCT No.: PCT/CN2016/082564
§ 371 (c)(1),
(2) Date: May 17, 2018

(87) PCT Pub. No.: WO2017/088366
PCT Pub. Date: Jun. 1, 2017

(65) Prior Publication Data
US 2018/0375415 A1    Dec. 27, 2018

(30) Foreign Application Priority Data

Nov. 25, 2015   (CN) .......................... 2015 1 0835630

(51) Int. Cl.
*H02K 33/18* (2006.01)
(52) U.S. Cl.
CPC ................... *H02K 33/18* (2013.01)
(58) Field of Classification Search
None
See application file for complete search history.

(56) References Cited

U.S. PATENT DOCUMENTS

| 8,624,449 B2* | 1/2014 | Kim | H02K 33/18 310/25 |
| 8,836,178 B2* | 9/2014 | Choi | H02K 33/16 310/25 |
| 8,987,951 B2* | 3/2015 | Park | H02K 33/16 310/12.22 |
| 9,350,220 B2* | 5/2016 | Kuroda | H02K 33/12 |

(Continued)

FOREIGN PATENT DOCUMENTS

| CN | 101221865 | 7/2008 |
| CN | 102035343 | 4/2011 |

(Continued)

*Primary Examiner* — Naishadh N Desai
(74) *Attorney, Agent, or Firm* — Themis Law

(57) ABSTRACT

A linear vibration motor includes a vibration block having permanent magnets and magnetic conductive yokes between adjacent permanent magnets; and a stator having stator coils arranged corresponding to the vibration block and magnetic conductive cores in the stator coils, a magnetic conductive brush being fixed on the magnetic conductive cores and a brush head of the brush being in elastic contact with the magnetic conductive yokes; or, a magnetic conductive brush being fixed on the magnetic conductive yokes and the brush head of the brush being in elastic contact with the magnetic conductive cores. The magnetic field lines generated by the vibration block can be concentrated to be conducted to the stator coils, thereby maximizing the effective magnetic field of the vibration block to improve the acting force between the vibrator and the and obtain an intensified vibration effect.

10 Claims, 5 Drawing Sheets

(56) References Cited

U.S. PATENT DOCUMENTS

| | | | | |
|---|---|---|---|---|
| 2011/0062803 A1* | 3/2011 | Lee | ............... | H02K 33/18 310/29 |
| 2011/0241451 A1* | 10/2011 | Park | ............... | B06B 1/045 310/25 |
| 2011/0309692 A1* | 12/2011 | Park | ............... | B06B 1/045 310/25 |
| 2013/0033128 A1* | 2/2013 | Yoon | ............... | H02K 33/16 310/25 |
| 2013/0057085 A1* | 3/2013 | Sugita | ............... | H02K 41/031 310/12.18 |

FOREIGN PATENT DOCUMENTS

| | | |
|---|---|---|
| CN | 102570764 | 7/2012 |
| CN | 103378703 | 1/2013 |
| CN | 103620929 | 3/2014 |
| CN | 104660106 | 5/2015 |
| CN | 105356712 | 2/2016 |
| CN | 205283369 | 6/2016 |
| JP | H11155274 | 6/1999 |
| JP | 2010179295 | 8/2010 |

\* cited by examiner

LINEAR VIBRATION MOTOR

TECHNICAL FIELD OF THE INVENTION

The present invention relates to technical field of consumer electronic, and more particularly, relates to a linear vibration motor for portable consumer electronic products.

BACKGROUND OF THE INVENTION

With the development of communication technology, portable electronic products such as mobile phones, handheld game player or handheld multimedia entertainment apparatus have come up to people's lives. In these portable electronic products, micro vibration motors are generally used for providing system feedback, such as mobile phones notification on an incoming call, game player's vibration feedback and the like. However, with the development tendency for electronic products to be lightening and thinning, a variety of internal components thereof also need to suitable for this tendency, and micro vibration motor is no exception.

The existing micro vibration motor generally comprises an upper cover, a lower cover which forms a vibration space with the upper cover, a vibrator (including a counterweight block and a permanent magnetic) performing a linear reciprocate vibration in the vibration space, an elastic support member connecting to the upper cover and driving the vibrator to perform a reciprocate vibration, and a stator coil located under the vibrator by a certain distance.

In the micro vibration motor with the above described structure, the magnetic members in the vibrator are disposed side by side and have the same magnetization direction, after the coil is energized, the stator will be subject to the Lorentz force which drives the stator to move, and the vibrator will be subjected to an acting force in the opposite direction by the relationship between the acting force and the reacting force and perform a linear vibration drove by this force. However, in the micro vibration motor of the above described structure, the magnetic field lines generated by the magnetic members in the vibrator are relatively dispersed, and the magnetic conductive strength between the vibrator and the stator is relatively weak, and correspondingly, the magnetic flux passing through the coil is also relatively small, thus the force generated thereby is relatively small, which disadvantageously affects the vibration effect.

SUMMARY OF THE INVENTION

In view of the above problems, the purpose of the present invention is to provide a linear vibration motor, which utilizes a magnetic conductive structure additionally provided between a stator and a vibrator to concentrate and guide the magnetic field generated by the vibration block to the stator coil, so as to maximize the effective magnetic field of the vibration block, thereby improving the acting force between the vibrator and the stator and obtaining an intensive vibration effect.

The present invention provides a linear vibration motor comprising a vibration block and a stator arranged in parallel with the vibration block, and the vibration block comprises at least two adjacent permanent magnets and magnetic conductive yokes arranged between each two of the at least two adjacent permanent magnets, the stator comprises a stator coil arranged corresponding to the vibration block and a magnetic conductive core arranged in the stator coil, wherein a magnetic conductive brush is fixed on the magnetic conductive core of the stator, and a brush head of the magnetic conductive brush is in elastic contact with the magnetic conductive yoke of the vibration block, or a magnetic conductive brush is fixed on the magnetic conductive yoke of the vibration block, and a brush head of the magnetic conductive brush is in elastic contact with the magnetic conductive core of the stator.

According to a preferred embodiment, the vibration block comprises three adjacent permanent magnets arranged side by side and two magnetic conductive yokes arranged between each two adjacent permanent magnets, and polarities of adjacent ends of each two adjacent permanent magnets are the same, and the stator comprises stator coil(s) arranged at one side or both upper and lower sides of the vibrator and magnetic conductive core(s) correspondingly arranged in the stator coil(s), and an axis direction of the stator coil(s) is perpendicular to a magnetization direction of the permanent magnets of the vibration block.

According to a preferred embodiment, the magnetic conductive brush has a herringbone structure or an arc shaped structure, wherein a middle top end of the magnetic conductive brush is fixed on the magnetic conductive core(s) of the stator, and brush heads provided at the two side ends of the magnetic conductive brush are respectively in elastic contact with the two magnetic conductive yokes of the vibration block, or two side ends of the magnetic conductive brushes are respectively fixed on the two magnetic conductive yokes of the vibration block, and a brush head provided at a middle top end of the magnetic conductive brush is in elastic contact with the magnetic conductive core(s) of the stator.

According to a preferred embodiment, the magnetic conductive brush is a bent copper sheet.

According to a preferred embodiment, the stator comprises stator coil(s) arranged at one side or both upper and lower sides of the vibration block and magnetic conductive core(s) correspondingly arranged in the stator coil(s), and an axis direction of the stator coils is perpendicular to a magnetization direction of the permanent magnets of the vibration block.

According to a preferred embodiment, the stator coils correspondingly arranged at upper and lower sides of the vibration block are parallel to each other and the axes thereof are located on a same straight line; current directions in the stator coils correspondingly arranged at upper and lower sides of the vibration block are opposite.

According to a preferred embodiment, a horizontal distance d between the magnetic conductive yoke and the magnetic conductive core in the horizontal direction is in a numerical range of 0.1 mm to 0.3 mm.

According to a preferred embodiment, the linear vibration motor further comprises a counterweight block having a one-piece structure, and a receiving groove for accommodating the vibration block is provided at a middle position of the counterweight block, and an avoidance structure for avoiding the stator is provided in the counterweight block at a position corresponding to the stator.

According to a preferred embodiment, the linear vibration motor further comprises a housing, and the counterweight block has a one-piece structure, and grooves are symmetrically arranged at two ends of the counterweight block, and push-pull magnets are accommodated and fixed in the grooves; push-pull coils surrounding the push-pull magnets are fixedly arranged on the housing at positions corresponding to the push-pull magnets, respectively.

According to a preferred embodiment, the linear vibration motor further comprises push-pull coil bobbins on which the push-pull coils are wound, respectively.

The above described linear vibration motor according to the present invention utilizes a magnetic conductive brush arranged between the stator and the vibration block to enable the magnetic field lines generated by the vibration block to be concentrated and conducted to the stator coils, thereby maximizing the effective magnetic field of the vibration block to improve the acting force between the vibrator and the stator and obtain a more intense vibration effect.

In order to achieve the above and related object, one or more aspects of the present invention comprise the features that will be described below in detail and particularly set forth in claims. The following description and the drawings explain certain illustrative aspects of the present invention in detail. However, these aspects are merely some of the various embodiments which can utilize the principles of the present invention. In addition, the present invention is intended to comprise all these aspects and their equivalents.

BRIEF DESCRIPTION OF THE DRAWINGS

The other purposes and results of the present invention will become more clear and easy to understand through the following descriptions in combination with the accompanying drawings and contents of claims, along with more fully understood of the present invention. In the drawings:

Figure 1:
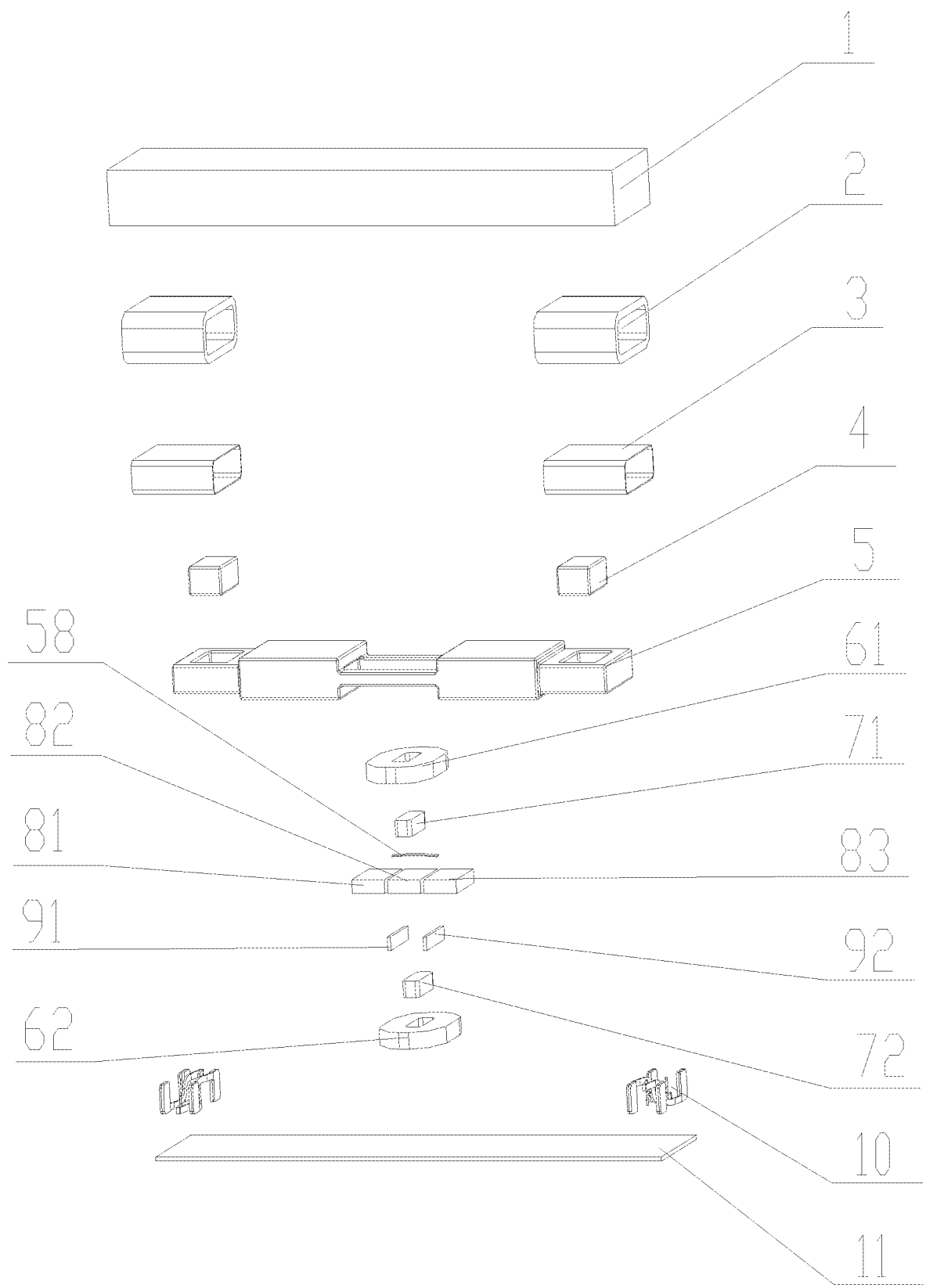
FIG. 1 is a schematic diagram of an overall exploded structure of a linear vibration motor according to the first embodiment of the present invention.

The reference numerals include: an upper housing 1, a lower cover 11, a push-pull coil 2, a coil bobbin 3, a push-pull magnet 4, a magnetic conductive block 42, a counterweight block 5, grooves 51, a receiving groove 52, a magnetic conductive brush 58, permanent magnets 81, 82, 83, magnetic conductive yokes 91, 92, stator coils 61, 62, magnetic conductive cores 71, 72, and spring plate 10

The same reference numbers indicate similar or corresponding features or functions in all of the drawings.

DETAILED DESCRIPTION OF EMBODIMENTS

In the following description, for the purposes of explanation, various specific details are described in order to provide a full understanding of one or more embodiments. However, it is apparent that these embodiments can be implemented without these specific details. In other examples, well-known structures and apparatus are illustrated in form of block diagram in order to facilitate describing the one or more embodiments.

The "counterweight block" used in the following detailed description of embodiments may also be referred to as "mass block", and both of them refer to a block having heavy mass and is made of high density metal which is fixed to a vibration block that generating vibration for vibration balance.

In addition, the present invention is mainly focus on the improvement in micro vibration motors, but it is not excluded that the technology disclosed in the present invention can be applied to a large vibration motor. However, in order to facilitate describing, in the following description of the embodiments, "linear vibration motor" and "micro vibration motor" refer to the same thing.

In the following, the particular embodiments of the linear vibration motor according to the present invention will be described in detail with reference to the accompanying drawings.

In order to solve the problem that the magnetic field lines are dispersed in the structure of the existing micro vibration motor, the present invention provides a linear vibration motor in which a magnetic conductive brush is arranged between the stator and the vibration block, and the magnetic field strength between the vibrator and the stator is improved by the magnetic conductive brush, so as to maximize the effective magnetic field strength of the vibration block within a limited space, thereby improving the acting force between the vibrator and the stator and effectively improving the vibration force of the micro vibration motor without increasing the volume of the micro vibration motor.

The linear vibration motor according to the present invention comprises a vibration block and a stator arranged in parallel with the vibration block, and the vibration block comprises at least two adjacent permanent magnets and a magnetic conductive yoke arranged between the adjacent permanent magnets; the stator comprises a stator coil arranged corresponding to the vibration block and a magnetic conductive core arranged in the stator coil, and a magnetic conductive brush is arranged between the stator and the vibration block, and the upper end and lower end of the magnetic conductive brush are in elastic contact with the magnetic conductive yoke of the vibration block and the magnetic conductive core of the stator respectively. Specifically, when the magnetic conductive brush is fixed onto the magnetic conductive core of the stator, the brush head of the magnetic conductive brush is in elastic contact with the magnetic conductive yoke of the vibration block; alternately, when the magnetic conductive brush is fixed onto the magnetic conductive yoke of the vibration block, the brush head of the magnetic conductive brush is in elastic contact with the magnetic conductive core of the stator.

That is to say, in the present invention, aiming at improving the magnetic field strength between the stator and the vibrator, a magnetic conductive brush is additionally provided between the vibration block and the stator, such that the magnetic field lines/magnetic induction lines generated by the vibration block can be more concentrated to pass through the stator coils, so as to increase the utilization rate of the magnetic field of the vibrating block.

The technical solution of the present invention will be described in more detail by the following two specific embodiments.

In particular, FIGS. 1, 2, 3a and 3b are respectively a schematic diagram of an overall exploded structure, a sectional diagram of an assembled structure, and a diagram illustrating driving principle of a linear vibration motor according to the first embodiment of the present invention.

Figure 2:
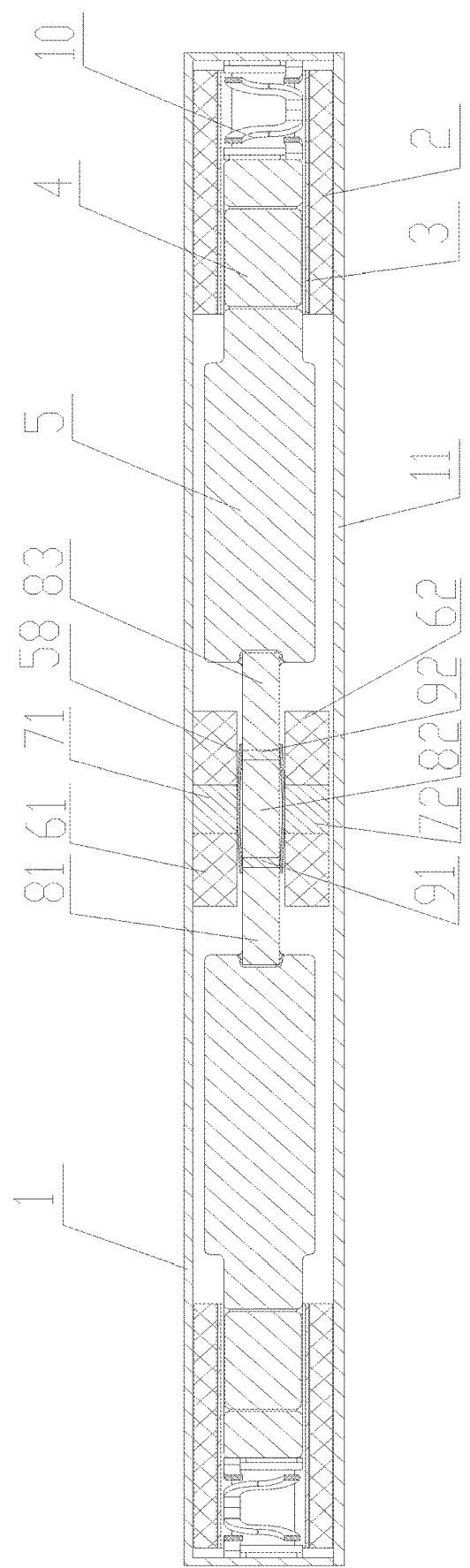
FIG. 2 is a sectional diagram of a combination structure of a linear vibration motor according to the first embodiment of the present invention.
Figure 3A:
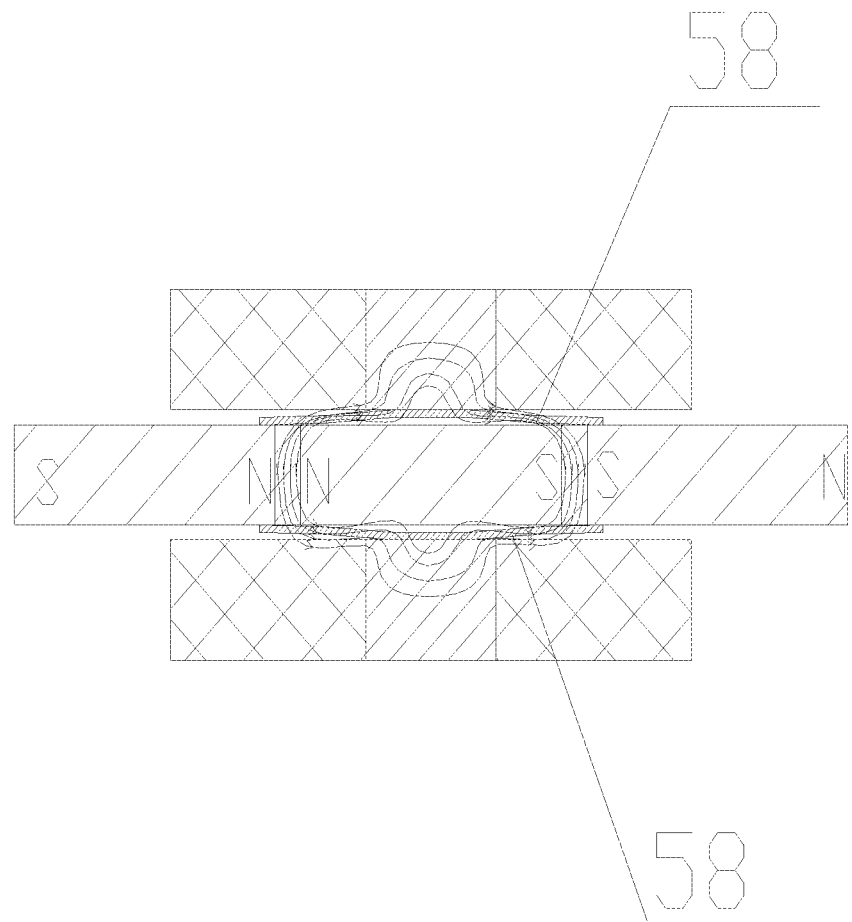
FIG. 3a and FIG. 3b are schematic diagrams of a magnetic conductive driving principle according to the first embodiment of the present invention.
Figure 3B:
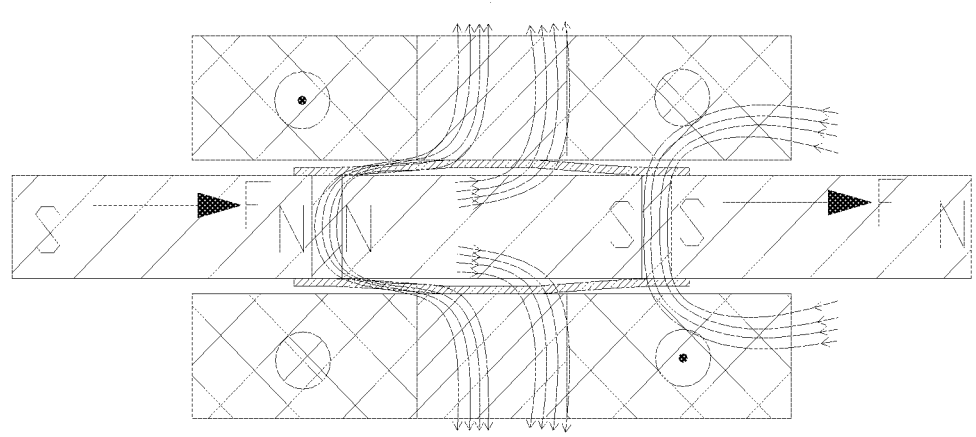

As shown in FIGS. 1 and 2, the linear vibration motor according to the first embodiment mainly comprises a housing, a vibrator, and a stator, and the stator is fixed on the housing and is arranged in parallel with the vibrator, wherein the housing comprises an upper housing 1 and a lower cover 11; the vibrator comprises a counterweight block 5 and a vibration block embedded and fixed in the counterweight 5; the vibration block comprises three adjacent permanent magnets 81, 82, and 83; and magnetic conductive yokes 91, 92 disposed between adjacent permanent magnets. The stator comprises stator coils 61 and 62 correspondingly arranged at the upper and lower sides of the vibration block, and magnetic conductive cores 71 and 72 respectively arranged in the stator coils 61 and 62. The magnetization direction of the permanent magnets in the vibration block and the axis direction of the stator coils are perpendicular to each other, and the magnetic conductive yokes in the vibration block and the magnetic conductive cores in the corresponding stator are arranged in a misaligned manner.

The magnetic conductive brush 58 has an arc-shaped structure and is arranged between the vibration block and the stator, wherein the brush heads of the magnetic conductive brush may be provided at the two side ends or at the top end of the magnetic conductive brush. The protruded top end of the arc-shaped magnetic conductive brush 58 is in contact with the magnetic conductive cores 71, 72 of the stator, and the two side ends of the magnetic conductive brush 58 are in contact with the two magnetic conductive yokes 91, 92 of the vibration block, respectively. Specifically, when the top end of the magnetic conductive brush 58 at the middle position thereof is fixed on the magnetic conductive cores 71, 72 of the stator, the brush heads arranged at the two side ends of the magnetic conductive brush 58 are in contact with the two magnetic conductive yokes 91, 92 of the vibration block respectively; alternatively, when the two side ends of the magnetic conductive brush 58 are fixed onto the two conductive yokes 91, 92 of the vibration block respectively, the brush head provided at the middle top end of the magnetic conductive brush 58 is in contact with the magnetic conductive cores 71, 72 of the stator. According to the schematic diagram of the vibration principle shown in FIGS. 3a and 3b, it can be seen that the magnetic field lines generated by the vibration block respectively pass through the stator coils vertically upward and downward. According to the left hand rule determining the direction of force that an energized conductor is subject to in a magnetic field and the current directions in the stator coils, the stator coils are subjected to leftward forces, wherein the current direction indicated by "⊙" is perpendicularly to the drawing plane and directed outwards, and the current direction indicated by "⊗" is perpendicularly to the drawing plane and directed inward. Since the stator coils are fixed and immovable, the vibration block is subjected to a rightward force F based on the relationship between the acting force and the reacting force. In this way, when the vibration block is subjected to a rightward driving force, the vibration block will drive and perform a rightward translational movement together with the counterweight block. Similarly, when the directions of the currents change, the stator coils are subjected to rightwards magnetic forces according to the left hand rule. Since the stator coils are fixed and immovable, the vibration block is subjected to a leftward force with opposite direction and the same magnitude, and the vibration block which is subjected to a leftward driving force will drive and perform a leftward translational movement together with the counterweight block. The above described movements are alternately performed, thereby driving the micro vibration motor to vibrate.

By providing the magnetic conductive brush 58, the originally dispersed magnetic field lines conducted by the magnetic conductive yokes in the vibration block are conducted and concentrated by the magnetic conductive brush to pass through the magnetic conductive cores of the stators provided at the upper and lower sides, thereby maximizing the magnetic flux passing through the stator coils and making the magnetic field of the vibration block can be effectively utilized.

In the specific application process, as the magnetic conductive brush, it can be considered to utilize a copper sheet bent into a specific structure or a magnetic conductive material having elastic structure such as an elastic plastic sheet coated with a magnetic conductive material.

Figure 4A:
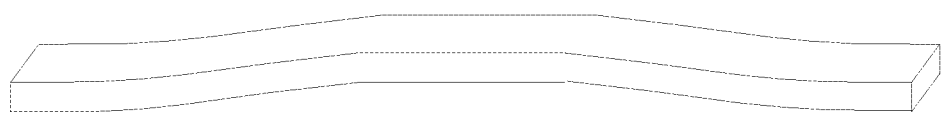
FIG. 4a and FIG. 4b are schematic structural diagrams of a magnetic conductive brush according to the first embodiment and the second embodiment of the present invention, respectively.
Figure 4B:
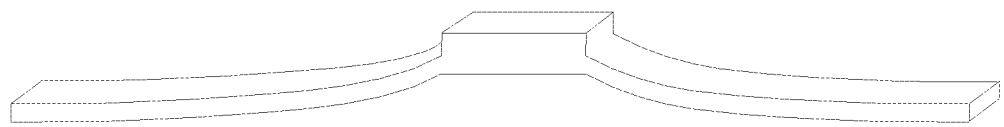

FIGS. 4a and 4b are schematic structural diagrams of magnetic conductive brushes according to the first embodiment and the second embodiment of the present invention, respectively.

As shown in FIG. 4a, the magnetic conductive brush according to the first embodiment has an arc-shaped structure, and the magnetic conductive brush according to the second embodiment shown in FIG. 4b has a herringbone structure, wherein the top end of the herringbone at middle portion of the magnetic conductive brush is in contact with the magnetic conductive core of the stator, and two side ends thereof are in contact with the two magnetic conductive yokes of the vibration block respectively. Specifically, when the middle top end of the magnetic conductive brush is fixed on the magnetic conductive core of the stator, the brush heads provided at two side ends of the magnetic conductive brush are in contact with the two magnetic conductive yokes of the vibration block respectively. Alternatively, when the two side ends of the magnetic conductive brush are fixed on the two magnetic conductive yokes of the vibration block respectively, the brush head provided at the middle top end of the magnetic conductive yoke is in contact with the magnetic conductive core of the stator.

Figure 6A:
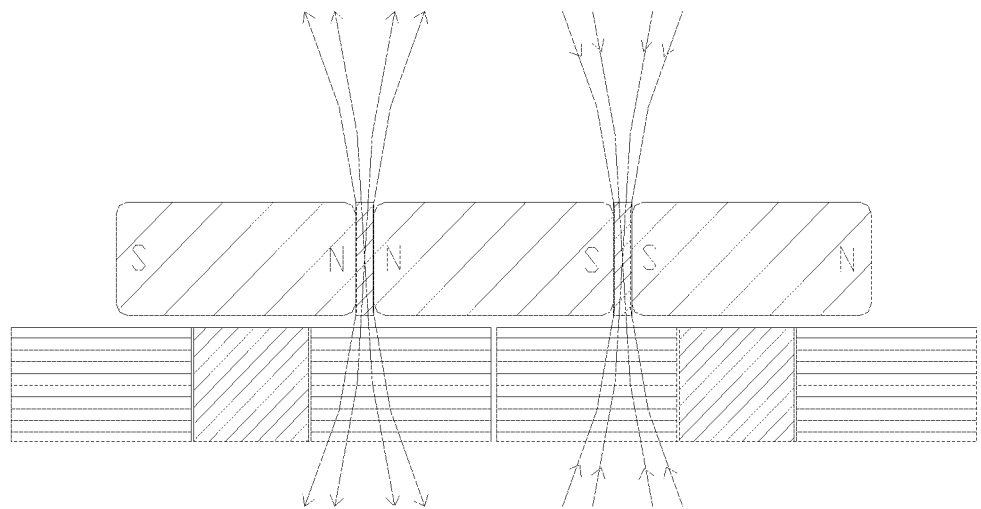
FIG. 6a and FIG. 6b are schematic diagrams of a combination structure of a vibration block and a stator according to an embodiment of the present invention respectively.
Figure 6B:
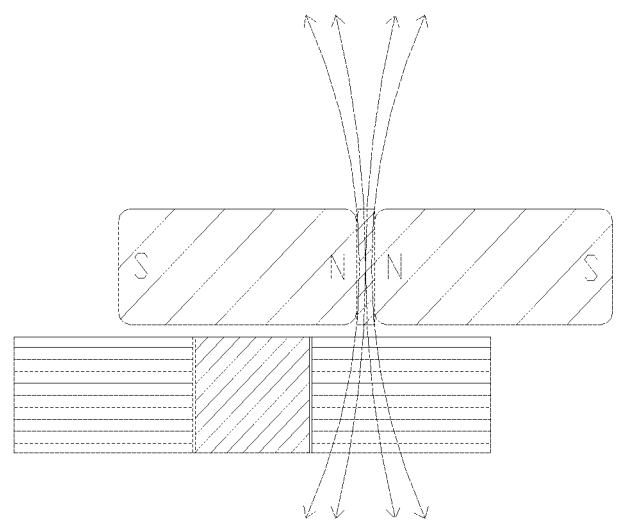

The linear vibration motor according to the first embodiment has a sandwich structure, i.e., an arrangement of the stators and the vibrator in the vertical direction is "stator-vibrator-stator". It also can be seen from the drawings that the stators comprises stator coils correspondingly arranged at the upper and lower sides of the vibration block and magnetic conductive cores arranged in the stator coils, and the stator coils correspondingly arranged at the upper and lower sides of the vibration block are parallel to each other and have opposite current directions. However, the linear vibration motor of the present invention is not limited to the sandwich structure shown in the first embodiment, but may also be designed as a structure with stator(s) arranged at one side thereof, i.e., the stator comprises stator coil(s) arranged at one side of the vibration block and magnetic conductive core(s) arranged in the stator coil(s), and the magnetization direction of the permanent magnet in the vibration block is perpendicular to the axis direction of the stator coil(s). The number and types (electromagnets, permanent magnets, magnetic conductive cores, etc.) constituting the stator and the combination manners thereof, as well as the number (e.g., two magnets) and types (electromagnets, permanent magnets, magnetic conductive cores, etc.) of magnets constituting the vibration block and the combination manners thereof can be appropriately selected according to the magnitude of the vibration force required by the products to which it is applied. More combination structures of the vibration block and the stator are shown in FIGS. 6a and 6b.

In addition, in a preferred embodiment of the present invention, it is also possible to additionally provide the linear vibration motor with additional push-pull mechanisms at two ends of the vibration block, and by utilizing the interaction force between the push-pull magnets fixed in the counterweight block and the push-pull coils fixed on the housing, it can provide a driving force for the reciprocating motion of the vibrator in a direction parallel to the plane where the stator is located.

Specifically, as shown in the embodiment of FIG. 1, the push-pull magnets 4 are symmetrically arranged at two ends of the vibrator, and push-pull coils 2 surrounding the push-pull magnets 4 are fixedly arranged on the housing at positions corresponding to the push-pull magnets 4, and the push-pull coils 2 are wound around the push-pull coil bobbins 3. After the push-pull coils 2 are energized, push-pull forces in the horizontal direction are generated between the push-pull coils 2 interaction and the push-pull magnets 4, so as to provide a driving force for the reciprocating motion of the vibrator in a direction parallel to the plane where the stator is located.

According to the vibration principle of the conventional motor, after the coil in the stator is energized, interactional push-pull forces are generated between the permanent magnets in the vibration block and the coils in the stators, which interact with each other, and the directions of the magnetic field lines generated by the stators are changed by changing the current directions of the coils in the stators, so as to drive the vibrator to reciprocally move in a direction parallel to the plane where the stator is located. However, in the micro vibration motor, due to the limitation on the volume of the micro vibration motor, the driving force that the original driving members can provide is extremely limited. In the present invention, however, the additionally provided drive structure composed of the push-pull magnets at two ends of the vibrator and the push-pull coils fixed on the housing can provide an additional driving force for the micro vibration motor, thereby effectively improving the vibration force of the micro vibration motor without increasing the volume of the micro vibration motor.

Figure 5:
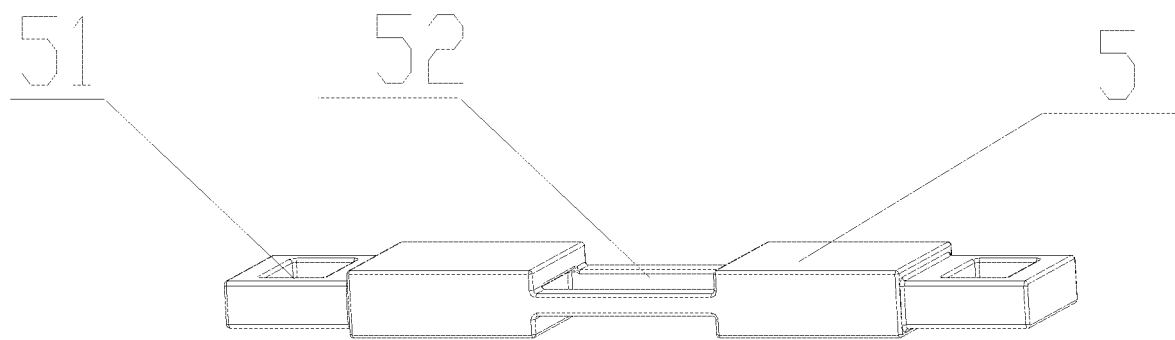
FIG. 5 is a schematic structural diagram of a counterweight block according to an embodiment of the present invention.

FIG. 5 shows the structure of a counterweight block according to an embodiment of the present invention.

As shown in FIG. 5, the counterweight block 5 has a one-piece structure. A receiving groove 52 for accommodating a vibration block is provided in the middle of the counterweight block 5, and grooves 51 for accommodating push-pull magnets are provided at two ends of the counterweight block. In addition, an avoidance structure for avoiding the stator is further provided at a position corresponding to the middle of the counterweight block, and a receiving groove 52 for accommodating the vibration block is provided at the center of the avoidance structure. In the specific process for assembling the counterweight block, the permanent magnets and the magnetic conductive yokes constituting the vibration block can be fixed together, and then the vibration block can be integrally fixed in the receiving groove 52 by means of coating with adhesive or laser welding, and the push-pull magnets 4 may also be fixed in the grooves 51 in a similar manner. In addition, in the first embodiment, the push-pull magnet 4 is a one-piece permanent magnet which is magnetized in the horizontal direction, and the axial directions of the push-pull coils 2 are parallel to the magnetization directions of the push-pull magnets 4.

The counterweight block 5 may be a block made of high density metal materials, such as a tungsten steel block, a nickel steel block or a nickel-tungsten alloy block, so as to increase the vibration force and make the vibration of the electronic product more intense.

As can be seen from FIGS. 2 and 5, since the grooves 51 for accommodating the push-pull magnets are arranged at two ends of the counterweight block 5, the additionally provided push-pull magnets do not increase the length or thickness of the vibrator, and the push-pull coils arranged surrounding the push-pull magnets are fixed on the housing, utilizing the avoidance space in the conventional motor structure, which also do not increase the volume of the micro vibration motor.

In the embodiments of the present invention, vibration reduction and collision prevention of the vibrator during vibration are achieved through elastic pieces respectively arranged at two ends of the vibrator. As shown in FIGS. 1 to 3, the elastic pieces 10 are located and fixed between the vibrator and the housing. The vibrator squeezes the elastic piece at one end during vibration, and the squeezed elastic piece can prevent the vibrator from colliding with the housing during the vibration. Meanwhile, the squeezed elastic piece can also provide an elastic restoring force in the opposite direction for the vibration of the vibrator.

In the above described embodiments, the magnetic conductive yokes in the vibration block and the corresponding magnetic conductive cores in the stators are arranged in a misaligned manner, and a horizontal distance d between the magnetic conductive yokes in the vibration block and the magnetic conductive cores in the stators corresponding to the magnetic conductive yokes is in the numerical range of 0.1 mm, 0.3 mm. That is, the horizontal distance between the center line of each magnetic conductive yoke and the center line of the magnetic conductive core of the corresponding (i.e., nearest) stator is 0.1 to 0.3 mm. Therefore, the left-right offset distance between the center axis of the vibration block and the center axis of the vibration block in stationary state is 0.2 mm when the vibration block drives the counterweight block to move reciprocally. Accordingly, the distance between the edge of the avoidance structure and the outer edge of the stator should be slightly larger than 0.2 mm.

In addition, the linear vibration motor according to the present invention further comprises a flexible printed circuit board (PFCB), and the stator may be fixed on the FPCB. The stator coil lead wires are connected to the external circuit through the circuit on the FPCB, and the FPCB is fixed to the housing.

The linear vibration motor according to the present invention is described by way of example with reference to the accompanying drawings. However, those skilled in the art should understand that various modifications can be made to the linear vibration motor according to the present invention without departing from the contents of the present invention. Therefore, the protection scope of the present invention should be determined by the contents of the appended claims.

The invention claimed is:

1. A linear vibration motor, comprising:
   a vibration block; and
   a stator arranged in parallel with the vibration block,
   wherein:
   the vibration block comprises at least two adjacent permanent magnets and a magnetic conductive yoke arranged between each two of the at least two adjacent permanent magnets;
   the stator comprises a stator coil arranged corresponding to the vibration block and a magnetic conductive core arranged in the stator coil, and wherein:
a magnetic conductive brush is fixed on the magnetic conductive core of the stator, and a brush head of the magnetic conductive brush is in elastic contact with the magnetic conductive yoke of the vibration block; or
a magnetic conductive brush is fixed on the magnetic conductive yoke of the vibration block, and a brush head of the magnetic conductive brush is in elastic contact with the magnetic conductive core of the stator.

2. The linear vibration motor according to claim 1, wherein:
the vibration block comprises three permanent magnets arranged side by side and two magnetic conductive yokes arranged between each two adjacent permanent magnets, and polarities of adjacent ends of each two adjacent permanent magnets are the same; and
the stator comprises one or more stator coils arranged at one side or both upper and lower sides of the vibration block and one or more magnetic conductive cores correspondingly arranged in the one or more stator coils, and an axis direction of the one or more stator coils is perpendicular to a magnetization direction of the permanent magnets of the vibration block.

3. The linear vibration motor according to claim 2,
wherein the magnetic conductive brush has a herringbone structure or an arc-shaped structure; and
wherein a middle top end of the magnetic conductive brush is fixed on the one or more magnetic conductive cores of the stator, and brush heads provided at two side ends of the magnetic conductive brush are respectively in elastic contact with the two magnetic conductive yokes of the vibration block; or
two side ends of the magnetic conductive brushes are respectively fixed on the two magnetic conductive yokes of the vibration block, and a brush head provided at a middle top end of the magnetic conductive brush is in elastic contact with the one or more magnetic conductive cores of the stator.

4. The linear vibration motor according to claim 1, wherein the magnetic conductive brush is a bent copper sheet.

5. The linear vibration motor according to claim 1, wherein:
the stator comprises one or more stator coils arranged at one side or both upper and lower sides of the vibration block and one or more magnetic conductive cores correspondingly arranged in the one or more stator coils; and
an axis direction of the stator one or more coils is perpendicular to a magnetization direction of the permanent magnets of the vibration block.

6. The linear vibration motor according to claim 5, wherein:
the stator coils correspondingly arranged at both upper and lower sides of the vibration block are parallel to each other, and axes of the stator coils are located on a same straight line; and
current directions in the stator coils correspondingly arranged at upper and lower sides of the vibration block are opposite.

7. The linear vibration motor according to claim 1, wherein a horizontal distance d between the magnetic conductive yoke and the magnetic conductive core is in a numerical range of 0.1 mm to 0.3mm.

8. The linear vibration motor according to claim 1, further comprising:
a counterweight block having a one-piece structure, wherein a receiving groove for accommodating the vibration block is provided at a middle position of the counterweight block; and
an avoidance structure for avoiding the stator is provided in the counterweight block at a position corresponding to the stator.

9. The linear vibration motor according to claim 8, further comprising a housing, wherein:
the counterweight block has a one-piece structure, grooves are symmetrically arranged at two ends of the counterweight block, and push-pull magnets are accommodated and fixed in the grooves; and
push-pull coils surrounding the push-pull magnets are fixedly arranged on the housing at positions corresponding to the push-pull magnets, respectively.

10. The linear vibration motor according to claim 9, further comprising push-pull coil bobbins on which the push-pull coils are wound respectively.

* * * * *